Aug. 19, 1969  B. L. A. VAN DER SCHEE  3,462,129
APPARATUS FOR TREATING HIGHLY VISCOUS MATERIALS
Filed Oct. 26, 1967  4 Sheets-Sheet 1

INVENTOR.
BERNARD LOUIS ANTON van der SCHEE
BY
AGENT

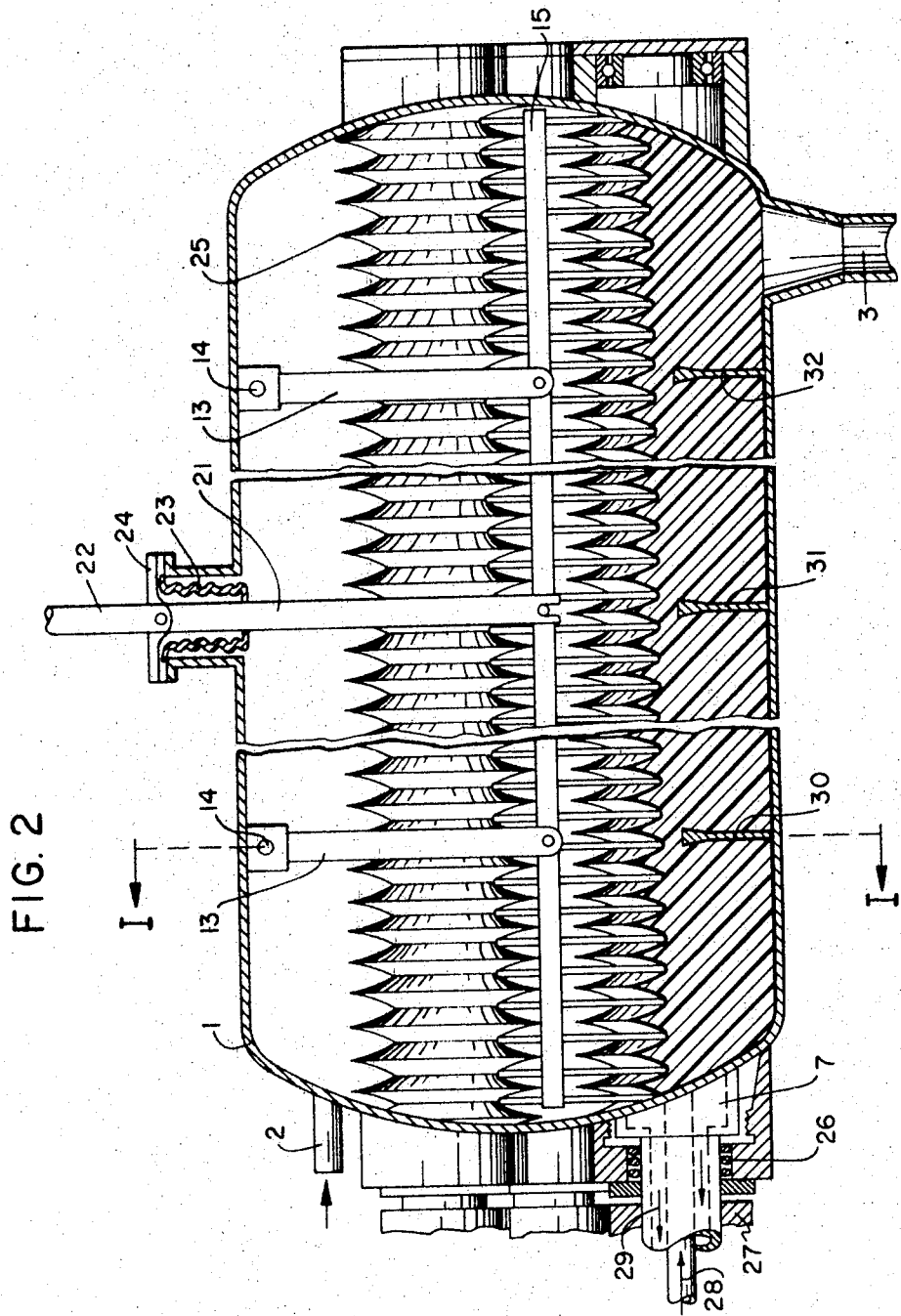

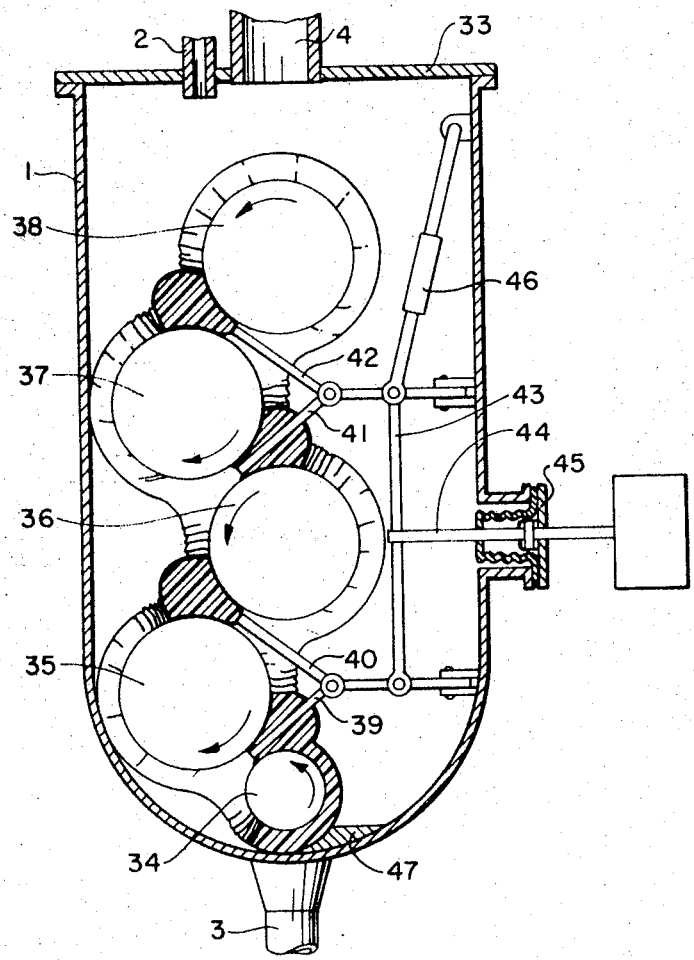

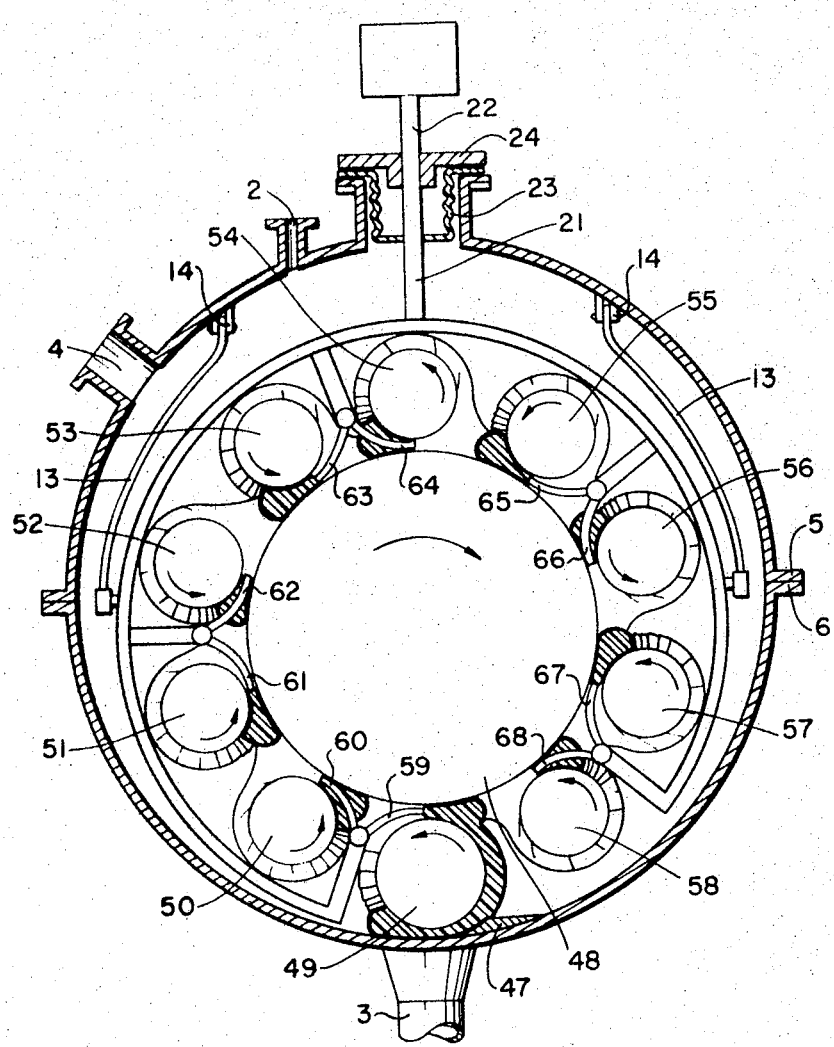

United States Patent Office 3,462,129
Patented Aug. 19, 1969

3,462,129
APPARATUS FOR TREATING HIGHLY VISCOUS MATERIALS
Bernard L. A. van der Schee, Velp, Netherlands, assignor to American Enka Corporation, Enka, N.C., a corporation of Delaware
Filed Oct. 26, 1967, Ser. No. 678,276
Claims priority, application Netherlands, Nov. 3, 1966, 6615482
Int. Cl. B01f 7/12, 7/28
U.S. Cl. 259—6   4 Claims

ABSTRACT OF THE DISCLOSURE

Apparatus for mixing, blending, homogenizing, dispersing low viscosity material in, and/or removing light fractions from high viscosity materials and the like consisting of a series of parallel, essentially cylindrical rolls and having means to increase the surface area of said materials, said means being a plurality of comb-like members coupled together and adapted for movement along the surface of said rolls.

---

The invention relates generally to apparatus for treating highly viscous materials such as rubber stock both natural and synthetic, plastics, foam, paste, dough, syrups and the like. More specifically, the invention relates to means for mixing, blending and/or removing light fractions or volatiles from highly viscous materials and comprises improvements in apparatus for such purposes having cooperating pairs of essentially cylindrical rolls that are positioned substantially parallel to and at some distance from each other and with means for rotating the rolls in opposite directions, convergently as viewed from above. Apparatus of this general type is shown in U.S. Patent No. 3,345,041 commonly assigned herewith and issued to Bernard L. van der Schee.

As fully described in the van der Schee patent, highly viscous materials are subjected to agitation, mixing, blending and the like. The process and apparatus of the patent also greatly facilitate removal of light weight fractions or volatiles (gas) from viscous materials.

The improved apparatus according to this invention is also suitable for the purposes described in the patent and further, it is particularly suitable for emulsifying substances of high viscosity in materials of low viscosity, for example, water, various alcohols, glycols, gases or the like. Thus it is apparent that substances having widely varying properties may be treated including the Newtonian liquids, visco-elastic materials, powder, paste, dough and the like. The apparatus is especially suitable for increasing the chain length of various synthetic polymers such as nylons and polyesters during their polymerization (condensation).

It is a chief aim of this invention to provide improvements in apparatus for mixing, blending, degassing materials of high viscosity and/or mixing materials of low viscosity with those of high viscosity.

Apparatus is provided having a plurality of cooperating sets of rolls with at least one roll further cooperating with one or more rolls of an adjacent pair. As a direct result of this expedient, material being treated is, within the space provided, distributed over an even larger area and a fresh surface is exposed to an evaporative atmosphere at a much higher rate. In addition, capacity is substantially increased and, by treating the material using the rolls arranged according to the invention, a more stable flow profile of the material is realized. This is especially advantageous when treating materials of a relatively low viscosity, for example, those materials with a viscosity of about 1000 poises or lower.

It is important to note an odd number of rolls may advantageously be used and still be in accordance to the invention as herein presented. For example, a single roll cooperating with an addition roll pair acts to form a second pair although only three rolls are actually utilized. As will be evidenced in the detailed description to follow, it is also conceivable to arrange a plurality of rolls, each cooperating as roll pairs and arranged in a plurality of groups. All rolls within each group act to form a unique system of cooperating roll pairs.

Similar to apparatus provided in the van der Schee patent, comb-like structure is provided and adapted to extend to and within the nip area formed by adjacent rolls. By use of such structure, upstanding ribs are formed on the material, thereby continuously providing an increased surface area to the effects of an evaporative atmosphere. Plural comb devices are provided herein and it is preferred that they be coupled together and movable in a longitudinal direction relative to the axis of the rolls. This type configuration has been found to simplify construction.

Although the arrangement of the rolls or roll pairs can be varied considerably, it is clear for reasons of construction simplicity that only a limited number of possibilities are economically attractive. A preferred embodiment consists in arranging the rolls in a circular configuration, with every two adjoining rolls forming a cooperating roll pair. Alternatively, all the rolls can be positioned vertically.

Preference for either embodiment will depend mainly on the use for which the apparatus is intended and whether the apparatus is to be used on existing equipment. For example, in removing gaseous components, excellent results are obtainable by mounting one large roll within a circle of smaller rolls, all of which are adapted for rotation opposite that in which the larger, centrally disposed roll is rotated. Each of the smaller rolls in effect thereby acts to form a roll pair with the centrally disposed large roll; none of the smaller rolls will form a cooperating roll pair with a neighboring small roll.

The invention can be described with reference to the accompanying drawings wherein various embodiments of the apparatus according to the invention are conveniently illustrated. Like numerals refer to like parts, unless otherwise noted.

FIGURE 2 illustrates a longitudinal section of a preferred embodiment (taken along line II—II of FIGURE 1).

FIGURE 3 is a cross-sectional view of a different embodiment according to the invention.

FIGURE 4 illustrates still another embodiment of apparatus according to the invention.

Figure 1:
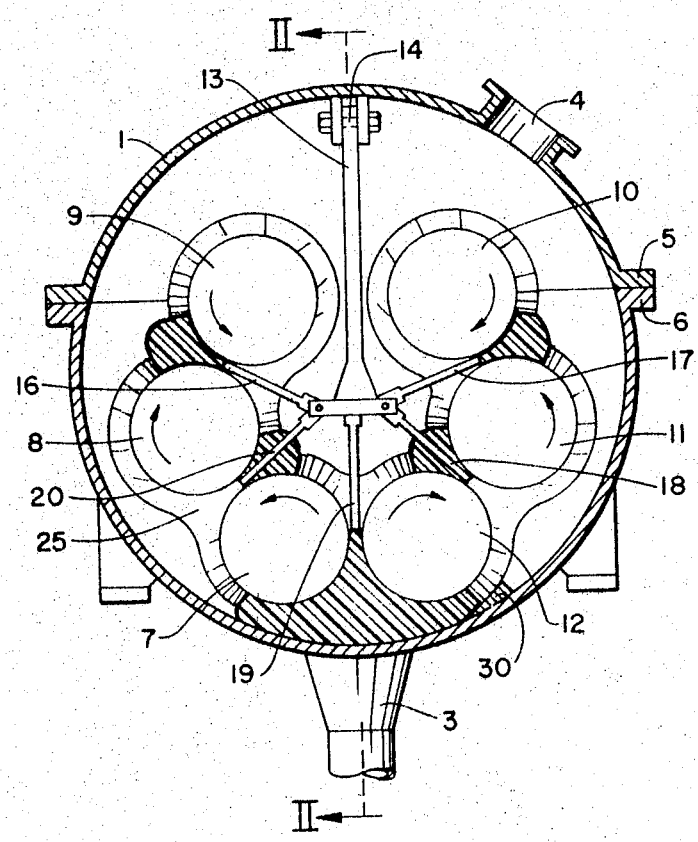
FIGURE 1 shows a cross-sectional view along the line I—I of the embodiment shown in FIGURE 2.

Referring particularly to FIGURES 1 and 2, numeral 1 illustrates a substantially cylindrical, air-tight housing structure which can be subjected to conditions of reduced pressure. Provided at the housing top and above the rolls is conduit (entry port) 2. The conduit is provided in order that material to be treated can be continuously fed into the apparatus of the invention. Provided in the housing bottom is a discharge port 3, through which the material to be treated can be removed. If preferred, a screw conveyor may be provided in said discharge port to facilitate the treated material's removal from the apparatus. Any convenient well-known conveyor means can be used.

The apparatuses as shown in the drawings are especially suitable for mixing and/or removing effluents from a melt of a highly viscous condensation polymer, for example, removing glycol from polyethylene terephthalate (PET) in order to increase the viscosity of the polymer above that normally obtained before the polymer is spun into filaments, fibers and yarn. It is clear, however, that the use of the apparatus should not be limited to reaction media due to the fact it is also suitable for carrying out many treatments where blending, mixing, dispersing materials and/or where removing light fractions or volatile by-products is necessary or desirable.

In preparing PET, discharge of glycol vapor from the housing is facilitated by conduit or discharge port 4. The conduit, if preferred, can be connected to a vacuum pump or the like.

Housing 1 preferably is constructed in two parts, joined at flanges 5 and 6.

Six rolls (7 to 12 inclusive) are circularly arranged within the housing. All rolls are adapted to be driven from the housing exterior; the direction of rotation is indicated by the arrows shown in FIGURE 1. It is, of course, possible to modify the apparatus shown whereby only one of the rolls is driven by a power source outside the housing and with the remainder being interconnected by a system of gears. Near the center line of the housing, beam 15 is hingedly suspended from two arms 13 and adapted for swivel movement on hinges 14. Attached to beam 15 are the comb-like members 16, 17, 18, 19 and 20. Teeth of the combs extend to between the roller pairs 8–9; 7–8; 7–12; 12–11; 11–10. All the teeth extend into the nip area of the respective roll pairs. Arm 21 engages the longitudinal beam 15 and reciprocates beam 15 back and forth in the housing (in a longitudinal direction). Arm 22 is hingedly supported by and passes through cover 24 of a dome provided on the upper side of housing 1. Bellows 23 is provided for sealing purposes. The bellows seal not only provides a tight seal when under vacuum but also allows movement of arm 22. FIGURE 1 shows the apparatus while in operation and therefore containing the viscous materials to be treated. Owing to the presence of comb members 16, 17, 18, 19 and 20, the material entrained between the rotating rolls will be formed into a system of upstanding ribs 25 which will extend around the major part of roll surfaces 7, 8, 9, 10, 11 and 12. The ribs will therefore collectively form a very large free surface area and are continuously renewed. As a result, new surface material segments are continuously exposed to an evaporative atmosphere in the housing and, accordingly, gaseous or lighter weight fractions will be caused to evolve from the material being treated and subsequently and rapidly removed from the housing.

FIGURE 2 shows passage from the driving roll, namely that of a shaft for roll 7. Numeral 26 refers (schematically) to a liquid-tight and vacuum-tight portal for roll 7 and numeral 27 refers to the bearings (schematically) for said roll. The method of sealing the entry and supporting the shafts is known in itself from vacuum technology; therefore, the particular construction used for purposes of the invention is not described in detail. In order to prevent low or high temperatures occurring within the apparatus, rolls 7, 8, 9, 10, 11 and 12 are provided with means for heat transfer. To this end tube 28 supplies a heat transfer liquid. The tube has a free end at the end of the roll so that the liquid being passed to the end can be carried back along the roll surface and be discharged through the annular opening around the inlet of tube 28. It is clear that it is also possible to cool the rolls with the aid of other known equivalent constructions.

Mounted on the bottom of the housing are a number of partitions 30, 31 and 32, which serve to prevent liquid portions from flowing directly over the bottom from the front end to the other end where the discharge opening is located. The partitions are rigged with overflow edges, not shown.

During operation, the system of combs 16 to 20 is reciprocated in order to continuously change the position of the upstanding ribs on the rolls in order to contribute to a satisfactory mixing and degassing of the material being treated.

In order to raise the ribs as far as possible, the peripheral speed of the rolls 7 and 12 is about 5% lower than that of the remaining rolls in the system. As a direct result, the amount of material that will be collected or massed on the bottom housing will be reduced to a minimum.

FIGURE 3 shows a somewhat different construction of apparatus according to the invention. In this embodiment housing 1 is trough-shaped, and also is of closed, vacuum-tight construction. Cover 33 provides access.

The cover is provided with the inlet port 2, and a discharge port is provided opposite thereto (at the housing bottom). The discharge port can also be provided with a screw conveyor.

Four rolls are mounted one above the other and in the manner shown in the embodiment. They are driven in the directions indicated by the arrows. A system of comb-like members 39, 40, 41 and 42 are connected to beam 43 in a manner similar to that used in the embodiment shown in FIGURE 1. The beam is adapted for back and forth movement and in a direction along the axis of the rolls by driving arm 44. This arm is passed through the housing wall by way of the cap 45. A vacuum-tight seal is provided in using the bellows.

This showing clearly illustrates how the ribs are formed around roll surfaces. Again, the peripheral speed of the bottom roll 34 is about 5% lower than that of the remaining rolls. As a result of this expedient, the liquid massed on the bottom is recycled. Since the other rolls are driven at equal speeds, the liquid will accumulate thereon approximately in equal amounts. The construction of bearings and the vacuum-tight seal (and for that matter, the cooling means for the rolls) corresponds to that used in the embodiment shown in FIGURES 1 and 2.

The housing bottom is provided with threshold 47 to make it easier for roll 34 to, in effect, "tear" a film off the mass of material pooled below the roll. The bottom is sloped in a manner to collect the material in one location, preferably immediately below roll 34. A flat housing bottom or the like could lead to degradation of the treated polymer by causing stagnant, uncollectable material formation. In the case of polymer material, this could eventually contaminate the entire system and resulting products.

FIGURE 4 shows another variant embodiment of the apparatus according to the invention. This embodiment corresponds essentially to that shown in FIGURE 1. The construction of the elements 1, 2, 3, 4, 5 and 6, 13, 14, 21, 22, 23 and 24 is the same for all practical purposes to that apparatus shown in FIGURES 1 and 2. Accordingly, the elements will not be further described.

In FIGURE 4, the embodiment illustrated refers to a single large-diameter roll 48, centrally mounted within the housing 1 and surrounded by ten smaller rolls 49, 50, 51, 52, 53, 54, 55, 56, 57 and 58. Each of said small rolls forms together with the large roll 48, a cooperating roll pair. None of the small rolls acts to form a cooperating roll pair with one another. All the small rolls are rotated in the same direction, and in a direction opposite to that which the large, centrally disposed roll is rotated. All rolls are cooled and driven in a manner which corresponds to that described with reference to FIGURE 2.

Hingedly suspended from arms 13 is a ring-like member which can be reciprocated in an axial direction by the swinging arm 21. In turn, this ring supports a large number of comb-like structures, each of which extend into the nip area and thus between a cooperating roll pair. The comb-like structures are identified by reference numerals 59 to 68 inclusive. Threshold 47 cooperates with the roll 49 in a manner that corresponds to the manner in which the threshold 47 cooperates with roll 34 in FIGURE 3. Similarly, the bottom roll 49 is driven at a peripheral speed which is about 5% lower than that of the other rolls. Accordingly, the part of the material being treated falling to the trough will be continuously removed and recycled to the rolls.

The apparatus as described in the drawing should be designed and operated in a manner to cause a rib formation extending near but not touching the inner housing walls. The ribs continuously rubbing against the inner walls causes undesirable fouling and contamination which eventually would have an unfavorable influence on the quality of the products obtained.

The apparatus may be fabricated of any material of construction having adequate strength, rigidity and freedom from deleterious effects on the material being mixed, degassed and the like.

It is also understood that many widely different embodiments of this invention may be made without departing from the spirit and scope thereof. It is not intended to be limited in any manner except as indicated in the appended claims.

What is claimed is:

1. In an apparatus for treating highly viscous materials comprising a cooperating pair of essentially cylindrical rolls positioned substantially parallel to and spaced from each other and having a comb-like member with segments extending to and within a nip area defined by said rolls, the improvement comprising, in combination, a plurality of rolls, with at least one of said rolls removed from but in working engagement with at least one roll of a pair of said rolls, and a plurality of comb-like members coupled together and adapted for movement along the surfaces of said rolls.

2. An improved apparatus according to claim 1 wherein the plural rolls are circularly arranged.

3. An improved apparatus according to claim 1 wherein the plural rolls are vertically arranged.

4. An improved apparatus according to claim 1 wherein at least one roll is positioned within a plurality of additional rolls, said roll being mounted for rotation in a direction opposite to that of said additional rolls.

References Cited

UNITED STATES PATENTS

| | | |
|---|---|---|
| 1,256,664 | 2/1918 | Davidson. |
| 2,078,777 | 4/1937 | Schade. |
| 2,326,927 | 8/1943 | Conrad. |
| 3,142,476 | 7/1964 | Goodwin _____ 259—6 |
| 3,336,008 | 8/1967 | Zoethout _____ 259—6 |

ROBERT W. MICHELL, Primary Examiner

JOHN M. BELL, Assistant Examiner

U.S. Cl. X.R.

18—2; 259—104